United States Patent
Rundle

(10) Patent No.: US 8,085,980 B2
(45) Date of Patent: Dec. 27, 2011

(54) MAIL PIECE IDENTIFICATION USING BIN INDEPENDENT ATTRIBUTES

(75) Inventor: Alfred T. Rundle, Endwell, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 805 days.

(21) Appl. No.: 12/191,019

(22) Filed: Aug. 13, 2008

(65) Prior Publication Data

US 2010/0040256 A1  Feb. 18, 2010

(51) Int. Cl.
*G06K 9/00* (2006.01)
(52) U.S. Cl. ........................................... 382/101
(58) Field of Classification Search .................... 382/101
See application file for complete search history.

(56) References Cited

U.S. PATENT DOCUMENTS

| | | | |
|---|---|---|---|
| 3,701,165 A | 10/1972 | Huddleston |
| 3,839,637 A | 10/1974 | Willis |
| 3,942,154 A | 3/1976 | Akami et al. |
| 3,991,706 A | 11/1976 | Pearl |
| 4,150,781 A | 4/1979 | Silverman et al. |
| 4,397,142 A | 8/1983 | Bingham |
| 4,527,383 A | 7/1985 | Bingham |
| 4,623,579 A | 11/1986 | Quon |
| 4,637,051 A | 1/1987 | Clark |
| 4,660,221 A | 4/1987 | Dlugos |
| 4,743,747 A | 5/1988 | Fougere et al. |
| 4,767,205 A | 8/1988 | Schwartz et al. |
| 4,775,246 A | 10/1988 | Edelmann et al. |
| 4,864,618 A | 9/1989 | Wright et al. |
| 4,934,846 A | 6/1990 | Gilham |
| 4,972,475 A | 11/1990 | Sant' Anselmo |
| 4,982,437 A | 1/1991 | Loriot |
| 5,036,610 A | 8/1991 | Fehr |
| 5,075,862 A | 12/1991 | Doeberl et al. |
| 5,142,482 A | 8/1992 | Sansone |
| 5,142,577 A | 8/1992 | Pastor |
| 5,227,617 A | 7/1993 | Christopher et al. |
| 5,283,422 A | 2/1994 | Storch et al. |
| 5,285,382 A | 2/1994 | Muehlberger et al. |
| 5,289,547 A | 2/1994 | Ligas et al. |
| 5,319,562 A | 6/1994 | Whitehouse |
| 5,337,361 A | 8/1994 | Wang et al. |

(Continued)

FOREIGN PATENT DOCUMENTS

CA  2152835  1/1996

(Continued)

OTHER PUBLICATIONS

GFT: Indicia Server, API Specification, Revision 1.2, Feb. 12, 2003, 41 pages.

(Continued)

*Primary Examiner* — Tom Y Lu
(74) *Attorney, Agent, or Firm* — Miles & Stockbridge P.C.

(57) ABSTRACT

An attribute-based system and method for mail piece identification includes generating and storing, during a first mail sorting operation, a first set of attribute information that can include an image fingerprint derived from a portion of an image of the mail piece. Then, in a subsequent mail sorting operation, a second image of the mail piece can be obtained and used, in part, to generate a second set of attribute information that may be compared to records in a mail piece database in order to identify the mail piece.

20 Claims, 7 Drawing Sheets

U.S. PATENT DOCUMENTS

| | | | |
|---|---|---|---|
| 5,375,172 A | 12/1994 | Chrosny | |
| 5,390,251 A | 2/1995 | Pastor et al. | |
| 5,498,034 A | 3/1996 | Ford | |
| 5,555,497 A | 9/1996 | Helbling | |
| 5,586,036 A | 12/1996 | Pintsov | |
| 5,592,561 A | 1/1997 | Moore | |
| 5,666,421 A | 9/1997 | Pastor et al. | |
| 5,675,650 A | 10/1997 | Cordery et al. | |
| 5,786,219 A | 7/1998 | Zhang et al. | |
| 5,798,834 A | 8/1998 | Brooker | |
| 5,822,739 A | 10/1998 | Kara | |
| 5,895,073 A | 4/1999 | Moore | |
| 5,917,925 A | 6/1999 | Moore | |
| 5,974,147 A | 10/1999 | Cordery et al. | |
| 6,005,945 A | 12/1999 | Whitehouse | |
| 6,039,257 A | 3/2000 | Berson et al. | |
| 6,064,995 A | 5/2000 | Sansone et al. | |
| 6,085,182 A | 7/2000 | Cordery | |
| 6,125,357 A | 9/2000 | Pintsov | |
| 6,249,777 B1 | 6/2001 | Kara et al. | |
| 6,381,589 B1 | 4/2002 | Leon | |
| 6,385,504 B1 | 5/2002 | Pintsov et al. | |
| 6,438,530 B1 | 8/2002 | Heiden et al. | |
| 6,505,179 B1 | 1/2003 | Kara | |
| 6,527,178 B1 | 3/2003 | Gordon et al. | |
| 6,701,304 B2 | 3/2004 | Leon | |
| 6,779,727 B2 | 8/2004 | Warther | |
| 6,816,844 B2 | 11/2004 | Leon | |
| 6,834,273 B1 | 12/2004 | Sansone et al. | |
| 6,889,214 B1 | 5/2005 | Pagel et al. | |
| 7,024,019 B2 * | 4/2006 | Sansone | 382/101 |
| 7,210,617 B2 | 5/2007 | Chaum | |
| 7,415,130 B1 * | 8/2008 | Rundle et al. | 382/101 |
| 7,590,260 B2 * | 9/2009 | Rosenbaum et al. | 382/101 |
| 2001/0042052 A1 | 11/2001 | Leon | |
| 2002/0026430 A1 | 2/2002 | Ryan, Jr. | |
| 2002/0096560 A1 | 7/2002 | Page | |
| 2002/0120668 A1 | 8/2002 | Pintsov et al. | |
| 2002/0168090 A1 | 11/2002 | Bruce et al. | |
| 2003/0062411 A1 | 4/2003 | Chung et al. | |
| 2003/0089765 A1 | 5/2003 | Kovlakas | |
| 2003/0101148 A1 | 5/2003 | Montgomery et al. | |
| 2003/0155703 A1 | 8/2003 | Zimmermann | |
| 2003/0182238 A1 | 9/2003 | Brookner et al. | |
| 2003/0219145 A1 | 11/2003 | Smith | |
| 2003/0225711 A1 | 12/2003 | Paping | |
| 2003/0232571 A1 | 12/2003 | Weinerth | |
| 2004/0059680 A1 | 3/2004 | Lang et al. | |
| 2004/0078346 A1 | 4/2004 | Amonette et al. | |
| 2004/0083189 A1 | 4/2004 | Leon | |
| 2004/0093312 A1 | 5/2004 | Cordery et al. | |
| 2004/0122779 A1 | 6/2004 | Stickler et al. | |
| 2004/0128190 A1 | 7/2004 | Campo et al. | |
| 2004/0128254 A1 | 7/2004 | Pintsov | |
| 2005/0039092 A1 | 2/2005 | Soule et al. | |
| 2005/0131840 A1 | 6/2005 | Pintsov et al. | |
| 2005/0256811 A1 | 11/2005 | Pagel et al. | |
| 2006/0122947 A1 | 6/2006 | Poulin | |
| 2006/0122948 A1 | 6/2006 | Poulin | |
| 2006/0122949 A1 | 6/2006 | Poulin | |
| 2007/0007341 A1 | 1/2007 | Poulin et al. | |
| 2009/0089254 A1 | 4/2009 | Von Kaenel et al. | |
| 2010/0100233 A1 | 4/2010 | Lu | |

FOREIGN PATENT DOCUMENTS

| | | |
|---|---|---|
| DE | 19812903 A1 | 3/1998 |
| EP | 0328320 A1 | 8/1989 |
| EP | 0663652 A2 | 7/1995 |
| EP | 0710930 A2 | 5/1996 |
| EP | 0741374 A2 | 5/1996 |
| EP | 0931297 | 7/1999 |
| EP | 0952558 A2 | 10/1999 |
| EP | 1035515 A2 | 9/2000 |
| EP | 1310917 A2 | 5/2003 |
| FR | 2708432 A1 | 2/1995 |
| GB | 2271452 A | 4/1994 |
| WO | WO 88/01818 A1 | 3/1988 |
| WO | WO 9721203 | 6/1997 |
| WO | WO 98/14907 | 4/1998 |
| WO | WO 9966456 | 12/1999 |
| WO | WO 0129781 A1 | 4/2001 |
| WO | WO 01/43053 A2 | 6/2001 |
| WO | WO 02/069103 A2 | 9/2002 |
| WO | WO 2004/012053 A2 | 2/2004 |
| WO | WO 2004/029754 A2 | 4/2004 |

OTHER PUBLICATIONS

Jimenez, Luis A., "The Mail in 2010", World Mail & Express Conference, London, May 15- 17, 2001.

International Preliminary Report on Patentability and Written Opinion dated Jun. 21, 2007.

Office Action dated Nov. 20, 2007 in U.S. Appl. No. 11/176,256.

Office Action dated Mar. 31, 2008 in U.S. Appl. No. 11/006,725.

Office Action dated Jul. 10, 2008, in U.S. Appl. No. 11/006,726.

Office Action dated Sep. 8, 2008, in U.S. Appl. No. 11/006,736.

Final Office Action dated Nov. 24, 2008, in U.S. Appl. No. 11/006,725.

Final Office Action dated Mar. 9, 2009, in U.S. Appl. No. 11/006,726.

Final Office Action dated Mar. 9, 2009, in U.S. Appl. No. 11/006,736.

Office Action dated Apr. 13, 2009, in U.S. Appl. No. 11/006,725.

Final Office Action dated Dec. 22, 2009, in U.S. Appl. No. 11/006,725.

Final Office Action dated May 12, 2010, in U.S. Appl. No. 11/006,736.

Final Office Action dated Jun. 11, 2010, in U.S. Appl. No. 11/006,726.

Australian Office Action dated Jul. 15, 2010, in Australian Patent Application No. 2005314482.

Australian Office Action dated Jul. 15, 2010, in Australian Patent Application No. 2005324481.

Australian Office Action dated Jul. 1, 2010, in Australian Patent Application No. 2005314480.

* cited by examiner

| |
|---|
| Unique Mail Piece ID (302) |
| Barcode Data (304) |
| Dimension Data (306) |
| OCR Results (308) |
| Address Recognition Results (310) |
| Mail Processing Machine ID (312) |
| Sort Bin (314) |
| Time Stamp (316) |
| Preceding Mail Piece ID (318) |
| Succeeding Mail Piece ID (320) |
| Virtual Identification Signature Data (322) |

FIG. 3

| |
|---|
| Unique Mail Piece ID (402) |
| Barcode Data (404) |
| Dimension Data (406) |
| OCR Results (408) |
| Address Recognition Results (410) |
| Mail Processing Machine ID (412) |
| Time Stamp (414) |
| Preceding Mail Piece ID (416) |
| Succeeding Mail Piece ID (418) |
| Virtual Identification Signature Data (420) |

FIG. 4

MAIL PIECE IDENTIFICATION USING BIN INDEPENDENT ATTRIBUTES

Embodiments of the present invention relate generally to mail sorting and, more particularly, to systems and methods for attribute-based mail piece identification.

Application of identification tags (ID tags) to mail pieces during a sorting operation in order to help uniquely identify each mail piece is a commonly used technique to improve mail sorting efficiency. By using ID tags, ZIP code information can be automatically or manually determined (or derived) from the address on a mail piece once, and then stored in a database record corresponding to that mail piece and indexed by ID tag. During subsequent sorting passes (or operations), the ID tag (e.g., a barcode) can be read and used to query the database to retrieve the previously determined ZIP code information. Thus, potentially saving cost and labor for determining ZIP code information multiple times (e.g., at the sending mail center and at the receiving mail center), which can be particularly advantageous for cases requiring video coding.

The bar-coded ID tag approach has been successfully applied to processing letter mail, and, more recently and less universally, to flats mail (magazines, oversize envelopes, catalogs, and the like). Some disadvantages and limitations of bar-coded ID tags can include recurring printing costs, difficulty of printing barcodes or applying bar-coded labels onto some mail pieces, obscuration of pre-printed information on the mail piece, and imperfect read rates for the barcodes.

An alternative to printing bar-coded ID tags is a process of re-identification of mail pieces by their image characteristics. Because this approach may be less accurate than decoding a barcode, it is may be necessary or favorable to limit the number of mail pieces whose image characteristics must be compared. Some conventional approaches to identification of mail pieces by image fingerprint or characteristics have included systems and methods that rely on informing the mail processing machine as to which tray contains the mail being currently fed into the machine. The trays in these conventional systems typically include an identification number such as a barcode, printed number, or other identification mark. The mail processing machine may be able to read the tray number automatically or the tray number may have to be input by an operator. Thus, these conventional systems require an operational environment that includes trays that are marked for identification, an automated (that may add additional costly circuitry or software) or a manual system (that may add additional costly labor) for reporting the tray number to the mail processing machine, and an information storage and retrieval system to keep track of what mail pieces are in which trays and possibly what the previous sorting operation was for that tray. Also, future sorting operations may require that sorting machine output bins be associated with a particular tray number or numbers prior to performing the sorting operation.

Embodiments of the present invention have been conceived in light of one or more of the disadvantages and limitations mentioned above with regard to conventional systems and methods, among other things.

In one exemplary embodiment, a method for identifying mail pieces is provided for those mail pieces that have not had a bar-coded ID tag applied, or for which the applied bar-coded ID tag could not be successfully read.

For example, an embodiment can include a centralized recognition system for sorting mail. The centralized recognition system can include a first computer having a first processor adapted to obtain, during a first sorting operation, a first image of at least one surface of a mail piece. The centralized recognition system can also include a second computer having a second processor, the second computer being coupled to the first computer and being adapted to receive from the first computer the mail piece image, a first request for address recognition and a first request for virtual identification signature extraction, the second computer adapted to create a database record in a mail piece database, the database record corresponding to the mail piece and being identified by a unique mail piece identification number. The centralized recognition system can include a third computer having a third processor, the third computer being coupled to the second computer and being adapted to receive from the second computer the mail piece image, the first request for address recognition and the first request for virtual identification signature extraction.

The third computer can be adapted to perform an automatic address recognition process on the mail piece image and to determine a virtual identification signature based on the mail piece image and a portion of a result of the automatic address recognition process, the third computer being adapted to provide the result of the automatic address recognition process and the virtual identification signature to the second computer. The second computer can be adapted to provide the result of the automatic address recognition process to the first computer and to update the database record to include the result of the automatic address recognition process and the virtual identification signature.

The first computer can be further adapted to receive the result of the automatic address recognition process and provide a sort attribute to a mail processing machine and, after the mail piece is sorted, to update the database record with a sort bin attribute and adjacency information associated with a preceding mail piece and to update a preceding mail piece database record with adjacency information associated with the mail piece.

During a second sorting operation subsequent to the first sorting operation, the first computer obtains a second image of at least one surface of the mail piece and attempts to identify the mail piece using a unique indicium in the second image, if a unique indicium is found then the database record for the mail piece is retrieved and the mail piece is sorted using the information in the database record, if a unique indicium is not found, then the first computer adds an entry to an unmatched mail piece list and the second image, a second request for address recognition and a second request for virtual identification signature extraction. Also during the second sorting operation, the second computer can create a new database record for the mail piece and to provide the second image, the second request for address recognition and the second request for virtual identification signature extraction of the second image to the third computer. And, the third computer is adapted to perform an automatic address recognition process on the second image and to determine a virtual identification signature based on the second image and a portion of a result of the automatic address recognition process on the second image, the third computer is adapted to provide the result of the automatic address recognition process on the second image and the virtual identification signature of the second image to the second computer.

The second computer provides the result of the automatic address recognition process on the second image and the virtual identification signature of the second image to the first computer and update the new database record with the result of the automatic address recognition process on the second image and the virtual identification signature of the second image. And, the first computer is adapted to add, during the second sorting operation, the result of the automatic address recognition process on the second image and the virtual identification signature of the second image to the entry in the unmatched mail piece list and, if there are entries in the unmatched mail piece list, to periodically and asynchronously perform a virtual identification signature matching process on any entries in the unmatched mail piece list.

The virtual identification signature matching process can also include the first computer processing each entry in the unmatched mail piece list and attempting to match the virtual identification signature of that entry to one of a plurality of virtual identification signatures associated with a predetermined number of database records selected from the mail piece database. The virtual identification signature matching process can also include the first computer deleting from the unmatched mail piece list any entries that have been identified by having a virtual identification signature that matches one of the predetermined number of database records selected from the mail piece database.

The predetermined number of database records can be selected from the mail piece database asynchronously with respect to the virtual identification signature matching process and each of the first and second mail sorting operations. If an entry from the unmatched mail piece list matches one of the predetermined number of records selected from the mail piece database, a mail piece database record created during the second sorting operation and corresponding to the matching entry is merged with a corresponding mail piece database record created during the first sorting operation. If an entry in the unmatched mail piece list remains unmatched after a predetermined period of time, then the first computer deletes the entry from the unmatched mail piece list and continues sorting of the mail piece associated with the unmatched entry if a destination was determined during the second sorting operation or requests a video coding operation if a destination was not determined during the second sorting operation.

In an embodiment, the predetermined number of database records includes only those in an expected mail sequence and the expected mail piece sequence is based on a mail piece sequence hypothesis determined using adjacency information recorded in mail piece records contained in the mail piece database.

In an embodiment, during the merging of the mail piece database record created during the second sorting operation corresponding to the matching entry and the corresponding mail piece database record created during the first sorting operation, the merged database record includes information determined during the second sorting operation.

In another example, an embodiment can include a centralized recognition system for sorting mail. The centralized recognition system can include a computer, having a processor, an attribute-based mail piece recognition module, and a computer readable medium with software instructions embodied thereon. The software instructions, when executed, can cause the processor to perform a series of steps. The series of steps can include obtaining, during a first sorting operation, a first image of at least one surface of a mail piece and adding a database record to a mail piece database, the database record corresponding to the mail piece. The series of steps can also include generating a first set of attribute information corresponding to the first image, the attribute information including a first signature based on one or more characteristics of the first image determined by performing an analysis of the first image, a digital representation of characters read from the mail piece, and a destination of the mail piece determined by performing an automatic address recognition using the characters read from the mail piece. The series of steps can include updating fields in the database record to store the first set of attribute information. The processor can then update adjacency information in another database record corresponding to a preceding mail piece to indicate that the mail piece has been sorted immediately after the preceding mail piece and to the same sort location as the preceding mail piece and also update the adjacency information of the mail piece record to reflect its adjacency to the preceding mail piece.

During a second sorting operation, the processor can obtain a second image of at least one surface of the mail piece and generate a second set of attribute information corresponding to the second image, including performing an analysis of the second image and determining a second signature based on one or more characteristics of the second image. The series of steps can include comparing data from records in the mail piece database with a portion of the second set of attribute information, and if the comparing results in an unambiguous match, performing a first series of sub-steps. The first series of sub-steps includes sorting the mail piece based on the first and/or second set of attribute information and updating the database record corresponding to the mail piece with information obtained during the second sorting operation. The first series of sub-steps can also include updating another database record to record adjacency information based on the second sorting operation; and forming a hypothesis of mail sequence based on the adjacency information contained in the database record corresponding to the mail piece.

If the comparing does not result in an unambiguous match, then the processor can perform a second series of sub-steps including sorting the mail piece based on attributes determined during the second sorting operation (or, if the attributes are insufficient for sorting purposes, the mail piece image may be sent to video coding for address resolution or to identify any remaining attributed that have not been identified); and adding an additional database record to the mail piece database, the additional database record corresponding to the mail piece and including the second set of attribute information.

Another exemplary embodiment includes a method for attribute-based mail piece identification. The method includes obtaining, during a first sorting operation, a first image of at least one surface of a mail piece, and adding a database record to a mail piece database, the database record corresponding to the mail piece. The method also includes generating a first set of attribute information corresponding to the first image, including performing an analysis of the first image and determining a first signature based on one or more characteristics of the first image. The method includes updating fields in the database record to store the first set of attribute information, and updating adjacency information in another database record corresponding to a preceding mail piece to indicate that the mail piece has been sorted immediately after the preceding mail piece and to the same sort location as the preceding mail piece.

The method includes obtaining, during a second sorting operation, a second image of at least one surface of the mail piece and generating a second set of attribute information corresponding to the second image, including performing an analysis of the second image and determining a second signature based on one or more characteristics of the second image. The method includes querying the mail piece database to select a number of mail piece records based on an expected mail piece sequence hypothesis and comparing a portion of the second set of attribute information against attribute information in each of the selected mail piece records.

The method includes determining if the comparing results in an unambiguous match, and, if so, performing a first series of sub-steps including sorting the mail piece based on the first and/or second set of attribute information, and updating the database record corresponding to the mail piece with information obtained during the second sorting operation. The first series of sub-steps also includes updating another database record to record adjacency information based on the second sorting operation, and forming a hypothesis of mail sequence based on the adjacency information contained in the database record corresponding to the mail piece.

If the comparing does not result in an unambiguous match, the method includes performing a second series of sub-steps including sorting the mail piece based on attributes determined during the second sorting operation and adding an additional database record to the mail piece database, the additional database record corresponding to the mail piece and including the second set of attribute information.

Another exemplary embodiment includes an apparatus for attribute-based mail piece identification. The apparatus includes means for obtaining, during a first sorting operation, a first image of at least one surface of a mail piece, and means for adding a database record to a mail piece database, the database record corresponding to the mail piece. The apparatus also includes means for generating a first set of attribute information corresponding to the first image, including performing an optical character recognition analysis of the first image and an automatic address recognition process on results of the optical character recognition and determining a first signature based on one or more characteristics of the first image. The apparatus includes means for updating fields in the database record to store the first set of attribute information.

The apparatus includes means for obtaining, during a second sorting operation, a second image of at least one surface of the mail piece, and means for generating a second set of attribute information corresponding to the second image, including performing an analysis of the second image and determining a second signature based on one or more characteristics of the second image.

The apparatus includes means for selecting a predetermined number of records from the mail piece database based on a hypothesis of expected mail piece sequence and comparing a portion of the second set of attribute information with attribute information in one or more of the selected records.

The apparatus includes means for performing a first series of sub-steps, if the querying results in an unambiguous match. The first series of sub-steps including sorting the mail piece based on the second set of attribute information, updating the database record corresponding to the mail piece with information obtained during the second sorting operation. The first series of sub-steps also includes updating another database record to record adjacency information based on the second sorting operation, and forming a hypothesis of mail piece sequence based on the adjacency information contained in the database record corresponding to the mail piece.

The apparatus includes means for performing a second series of sub-steps, if the querying does not result in an unambiguous match. The second series of sub-steps including, deferring the processing of the mail piece, and processing one or more subsequent mail pieces until a mail piece is identified. The second series of sub-steps also includes determining the identification of any deferred mail pieces based on adjacency information associated with the identified mail piece.

BRIEF DESCRIPTION OF THE DRAWINGS

FIG. 3 is a diagram of an exemplary data record for use with an attribute-based mail piece identification system;

FIG. 4 is a diagram of an exemplary data record for use with an attribute-based mail piece identification system;

DETAILED DESCRIPTION

Figure 1:
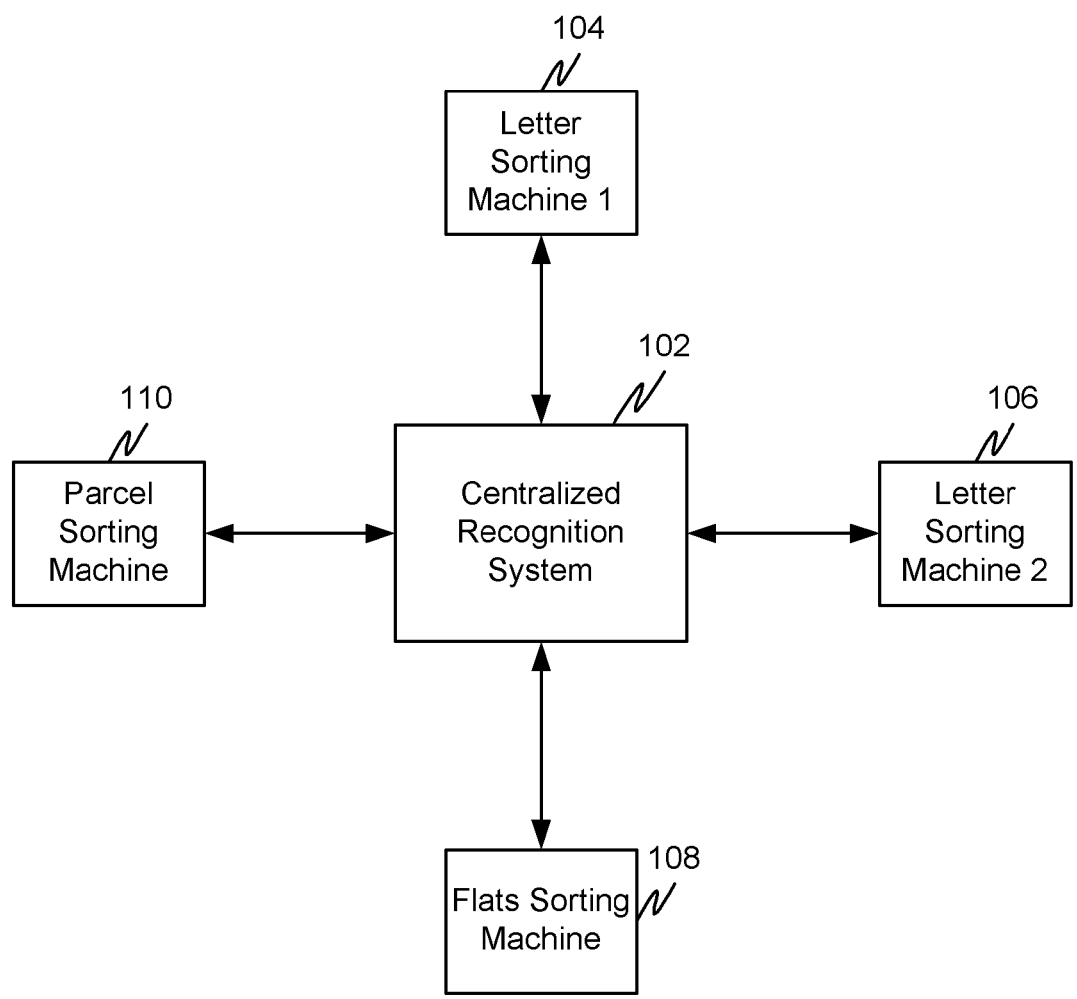
FIG. 1 is a diagrammatic view of an exemplary mail sorting facility.

FIG. 1 is a diagrammatic view of an exemplary mail sorting facility. In particular, the mail sorting facility includes a centralized recognition system 102 connected to a plurality of mail sorting devices including a first letter sorting machine 104, a second letter sorting machine 106, a flats sorting machine 108, and a parcel sorting machine 110.

The letter sorting machines 104 and 106 are typically used for sorting letter mail such as letters and postcards. The flats sorting machine 108 is used for sorting articles known in the postal industry as "flats," which include magazines, oversize envelopes, advertising flyers or materials, and the like. The parcel sorting machine 110 is used for sorting parcels such as boxes and padded envelopes or bags containing relatively thick objects. While embodiments are described in connection with mail sorting for purposes of illustrating and explaining aspects of the present invention, it will be appreciated that other embodiments of the methods, systems and software described herein can also be used in the handling and sorting of other articles such as products or media, or can be adapted and constructed for use in any object handling system where attribute-based identification or recognition may be desired.

In operation, the mail sorting devices capture an image of each mail piece (letter flat or parcel) that is being sorted or handled. Each image can be sent to the centralized recognition system 102 for recognition (automatic, manual or both) of information printed on the mail piece surface such as destination address, return address, and the like. Information derived from each mail piece can be stored in a mail piece database for later retrieval. The mail piece database can be indexed by mail piece identification number. The stored information can include image information, text information recognized from the mail piece, sorting machine specific information, or the like. Based on the destination address information recognized from a mail piece image, the centralized recognition system 102 can provide the mail sorting device with a value used for sorting (e.g., a post code such as a ZIP code or a more or less fine version of the ZIP code) depending, for example, on the sort plan and the nature of the sorting operation being performed.

By providing a centralized recognition system 102, complexity and cost of mail sorting facilities may be reduced. The centralized recognition system 102 is able to service a plurality of sorting machines with a specific number being dependent on the processing speed and throughput of the centralized recognition system 102. The centralized recognition system 102 can include a single database for storing mail piece information gathered from each sorting machine, or may include multiple databases adapted for each type of mail piece being handled (i.e., letter, flat and parcel).

Embodiments described herein and their respective operational examples are described in terms of a first and second sorting operation. For example, the first sorting operation can be an image lift pass or an outgoing primary sort. The second sorting operation can be an inward sort. It will be appreciated by one of ordinary skill in the mail handling art that there can be more than two sorting passes and that the passes can be performed on the same or different mail processing machine in the same or different mail facility. Also, the term bin or sorting endpoint is used herein to refer to all forms of sorting endpoints such as bins, runouts, chutes, stackers, or the like.

The virtual identification signature matching process described in various embodiments preferably achieves a match of two virtual identification signatures describing the same mail piece, where each signature is extracted from images captured during different mail transport passes, and often on different transports. The virtual identification signature matching process can tolerate a considerable degree of variation between signatures, which can be caused by image capture variability, and this tolerance may introduce a certain level of susceptibility to false positive matches (i.e., asserting a signature match to a wrong mail piece record). One way to limit the degree or percentage of false positive match occurrences is to limit the search range for signature match to a subset of mail piece records that is relatively small.

The exemplary mail piece databases described below can include information about the sequence of mail sorted into each sort bin. In particular, each database record for a mail piece can include fields for the mail piece identification number (MPID) of immediately preceding and succeeding mail pieces. This information can be used as a simple form of virtual identification, in that a match may be asserted to a mail piece predicted by the sequence of mail establish during the previous sort operation. This simplified approach can be too error-prone, however, for transport designs for which shuffling can occur as mail piece are discharged into a tray or similar container. For such transports, confirmation of individual mail piece characteristics are provided by embodiments of this invention.

The assumption that the mail piece sequence experienced during a subsequent transport passes is closely correlated to the mail sequence achieved during the prior sort pass is of value, however. This assumption can provide for the search set of database records to be narrowed based on an expected mail piece sequence. Of course, the extent to which this assumption is valid can depend on a number of factors including transport design and the operational scenarios for sweeping and feeding mail, and these factors may be considered in the design of a particular embodiment.

An expected (or hypothesized) mail piece sequence can be based, in part, on the identification of an "anchor" mail piece. An anchor mail piece refers to a mail piece that has a highly confident (e.g., virtually certain) match to a single record in a mail piece database, without using prior knowledge of expected mail piece sequence. Detection of anchor mail pieces, in conjunction with the information contained in the mail piece database records for anchor mail pieces, provides a mail sequence context that can enable signature matching for neighboring mail pieces to be performed against a reduced search set that can be defined by a predetermined number of mail pieces in each direction from the unmatched mail piece location according to the expected mail piece sequence. Anchor mail pieces can be defined by a number of criteria, such as, for example, a unique physical identification tag that is readable and can be matched to a database record, other barcodes or barcode combinations that correlate to a single database record, an address delivery point match coupled with a supporting virtual identification signature match, or the like.

An exemplary embodiment may maintain knowledge of multiple anchor mail pieces and can construct multiple hypotheses for expected mail piece sequence. Maintaining knowledge of multiple anchor mail pieces can be used to address a problem that may occur in a situation where a single anchor mail piece is used: that is, the matching system may be confused if the anchor mail piece is shuffled within the mail piece sequence. Another situation that can cause confusion when using a single anchor can occur at tray transitions at the feeder, which can introduce breaks in mail sequence.

In another example, a mail piece may be selected as an anchor only if it meets the anchor criteria described above and it introduces a mail sequence hypothesis that is inconsistent with mail sequences already denoted by existing anchors. Alternatively, anchors may be added when a mail piece meets the anchor criteria described above and they are consistent with the expected mail piece sequence.

For example, a search set can be based on an expected mail piece sequence and can include a number (e.g., 50) of mail piece database records in one or both directions (preceding and/or succeeding), and can be centered on a predicted mail piece.

Figure 2:
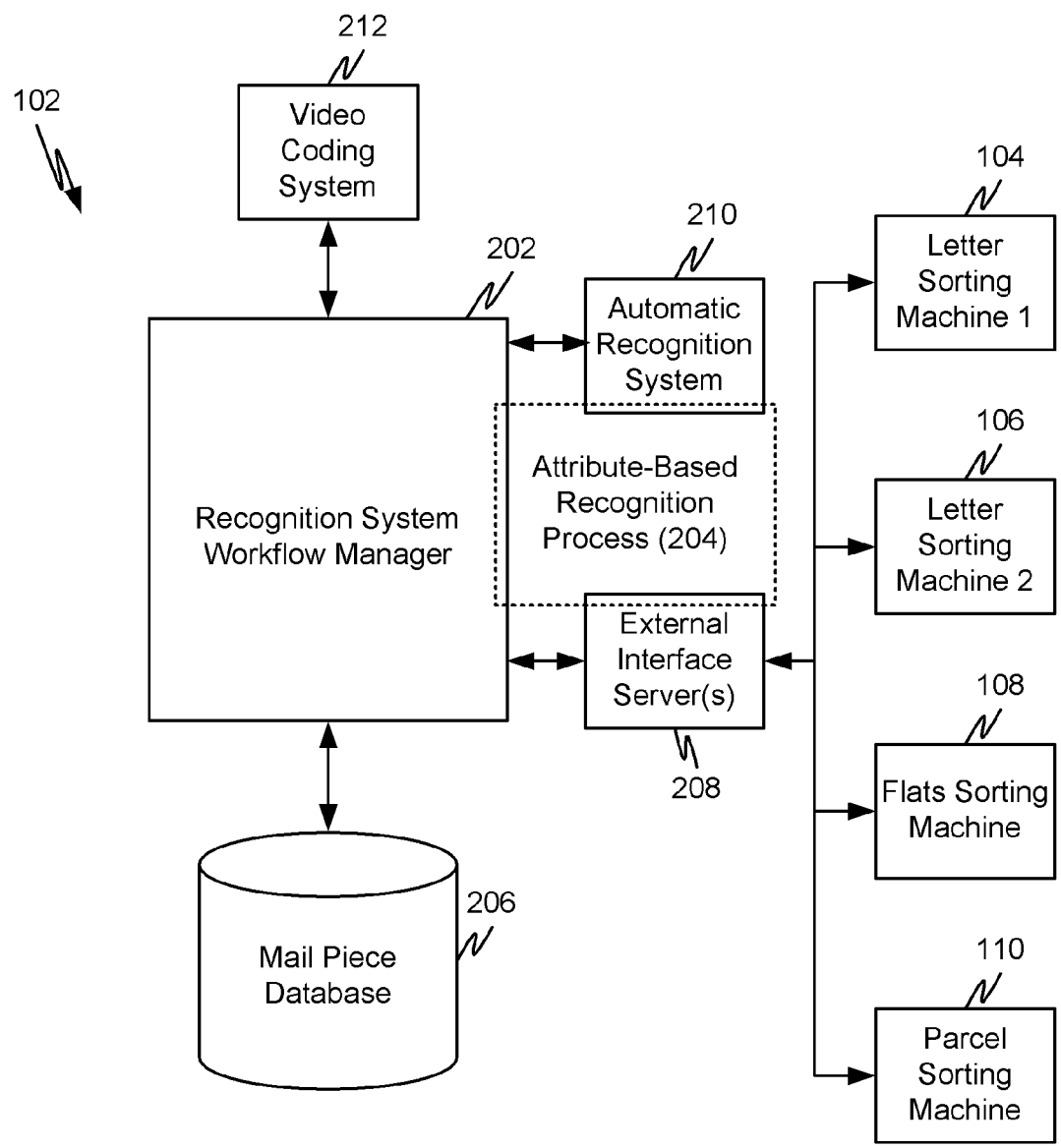
FIG. 2 is a diagram showing an exemplary centralized recognition system.

FIG. 2 is a diagram showing an exemplary centralized recognition system. Particularly, centralize recognition system 102 includes a recognition system workflow manager 202 having an attribute based recognition process 204. The recognition system workflow manager 202 is coupled to a mail piece database 206, one or more external interface servers 208, an automatic recognition system 210, and a video coding system 212. The external interface server(s) 208 provide an interface between the recognition system workflow manager 202 and the mail sorting machines (104-110).

In operation, the external interface server 208 has a first processor and obtains, during a first sorting operation, a first image of at least one surface of a mail piece. The recognition system workflow manager 202 receives a recognition request from one of the sorting machines (104-110) via the external interface server 208. The request can include, for example, an image of the mail piece and information regarding the type of sort being performed and the level of detail that the destination address is needed to be resolved to. The request can also include a request that a virtual identification signature be extraced or generated based on an analysis of the image. The mail piece image can be generated by an imaging apparatus or means such as a line scanner, array scanner or any known or later developed imaging device that is suitable for use in mail piece imaging applications. The request can also include other machine specific information such as machine ID, time, sequence number. The recognition system can include a capability for generating and assigning a unique mail piece identification number to the recognition request and storing the unique mail piece identification number in a record of the mail piece database 206. The unique identification number can be used as a key value for storing information about the mail piece in the mail piece database 206. The recognition system workflow manager 202 or external interface server(s) 208 can provide means for adding, updating and querying the mail piece database 206 (which may include a database server computer).

The attribute based recognition process 204 can provide means for generating a set of attribute information to be used for virtual identification signature purposes (i.e., extracting or generating a virtual identification signature), and for forming a hypothesis of mail sequence based on adjacency information contained in a database record corresponding to a mail piece. The automatic recognition system 210 can receive from the workflow manager, the mail piece image, the request for address recognition and the request for virtual identification signature extraction. The automatic recognition system 210 can be adapted to perform an automatic address recognition process on the mail piece image and to determine a virtual identification signature based on the mail piece image and a portion of a result of the automatic address recognition process. The automatic recognition system 210 can be adapted to provide the result of the automatic address recognition process and the virtual identification signature to the workflow manager.

The workflow manager can provide the result of the automatic address recognition process to the eternal interface server and update the database record to include the result of the automatic address recognition process and the virtual identification signature.

The external interface server can receive the result of the automatic address recognition process and provide a sort attribute to one of the mail processing machines. After the mail piece is sorted, the external interface server can update the database record for the mail piece with a sort bin attribute and adjacency information associated with a preceding mail piece and to update a preceding mail piece database record with adjacency information associated with the mail piece.

During a second sorting operation subsequent to the first sorting operation, an eternal interface server can obtain a second image of at least one surface of the mail piece and attempt to identify the mail piece using a unique indicium in the second image. If a unique indicium is found then the database record for the mail piece is retrieved and the mail piece is sorted using the information in the database record.

If a unique indicium is not found, then the external interface server adds an entry to an unmatched mail piece list and sends the second image, a second request for address recognition and a second request for virtual identification signature extraction to the workflow manager. The workflow manager (or external interface server) creates a new database record for the mail piece and provides the second image, the second request for address recognition and the second request for virtual identification signature extraction of the second image to the automatic address recognition server.

The automatic address recognition server can perform an automatic address recognition process on the second image and determine a virtual identification signature based on the second image and a portion of a result of the automatic address recognition process on the second image. The automatic address recognition server can provide the result of the automatic address recognition process on the second image and the virtual identification signature of the second image to the workflow manager.

The worklfow manager can provide the result of the automatic address recognition process on the second image and the virtual identification signature of the second image to the eternal interface server and update the new database record with the result of the automatic address recognition process on the second image and the virtual identification signature of the second image.

The external interface server can add, during the second sorting operation, the result of the automatic address recognition process on the second image and the virtual identification signature of the second image to the entry in the unmatched mail piece list. If there are entries in the unmatched mail piece list, the external interface server can periodically and asynchronously perform a virtual identification signature matching process on any entries in the unmatched mail piece list. The virtual identification signature matching process can include the external interface server processing each entry in the unmatched mail piece list and attempting to match the virtual identification signature of that entry to one of a plurality of virtual identification signatures associated with a predetermined number of database records selected from the mail piece database.

The virtual identification signature matching process can include the external interface server deleting from the unmatched mail piece list any entries that have been identified by having a virtual identification signature that matches one of the predetermined number of database records selected from the mail piece database. The predetermined number of database records selected from the mail piece database are selected asynchronously with respect to the virtual identification signature matching process and each of the first and second mail sorting operations. If an entry from the unmatched mail piece list matches one of the predetermined number of records selected from the mail piece database, a mail piece database record created during the second sorting operation and corresponding to the matching entry is merged with a corresponding mail piece database record created during the first sorting operation. The merged database record includes information determined during the second sorting operation.

Also, if an entry in the unmatched mail piece list remains unmatched after a predetermined period of time, then the external interface server can delete the entry from the unmatched mail piece list and continue sorting the mail piece associated with the unmatched entry if a destination was determined during the second sorting operation or request a video coding operation if a destination was not determined during the second sorting operation.

The attribute-base recognition process 204 is preferably a distributed process (as shown), but could also be implemented and/or executed on a single computer or processor. As shown in FIG. 2, the attribute-based recognition process 204 is performed partially on each of the recognition system workflow manager 202, the external interface servers 208, and the automatic recognition system 210.

The request is typically first passed to the automatic recognition system 210. If the address information printed on the mail piece is able to be resolved and recognized to the desired level of detail with sufficient confidence, then the automatic recognition system 210 can return the desired destination address information to the recognition system workflow manager 202.

Occasionally, the destination address information on a mail piece cannot be read automatically by the automatic recognition system 210 to the desired level detail or with a desired confidence. In these cases, the recognition request can be sent to the video coding system 212. The video coding system 212 includes terminals where human operators can view mail piece images and code (via keyboard, mouse, voice input, gesturing device, pointing device, or the like) the destination address information into the system and the coded destination information can be sent to the recognition system workflow manager 202.

In the event of automatic recognition, video coding or a combination of the two, the mail piece information can be stored in the mail piece database 206 by the recognition system workflow manager 202, which can also forward the requested destination information on to the mail sorting machine that made the recognition request. Mail pieces can be marked with an identification tag associated with a unique mail piece identification number (MPID), which can be read and used as an index to the mail piece database for retrieving the record corresponding to the mail piece. However, if the identification tag cannot be read or it is prohibitive in some aspect to use identification tags, then an attribute-based identification method can be used.

The attribute-based recognition process 204 can be used, during a first sorting operation, to store attribute information associated with each mail piece in the mail piece database. Then, during a subsequent sorting operation, the attribute-based recognition module can be used to identify mail pieces based on one or more attributes determined during the first sorting pass. By using the attribute-based recognition process 204, a need to perform a subsequent automatic recognition or video coding operation can be avoided.

The attribute-based recognition process 204 can be embodied as software components encoded in a computer readable medium such as a magnetic storage, optical storage, RAM, ROM, or any other now known or later developed computer readable medium. The components may also be implemented in hardware or a combination of hardware and software. Each software component can include one or more modules, routines, objects or functions.

For example, the attribute-based recognition process 204 can include a component for virtual identification signature extraction. The extraction component extracts or creates the virtual identification signature for a mail piece. This is done through an automatic analysis of the mail piece image. The automatic analysis can be combined with a manual analysis, such as a result of a video coding operation. The extract component may execute after an automatic address recognition process because the extract component may use a portion of the automatic address recognition results as input. The output of the extract component is a data structure representing the virtual identification signature of the mail piece.

The attribute-based recognition process 204 can include an unmatched mail pieces data construct. This data construct can be an array or list that includes those mail pieces that have not yet been matched by virtual identification signature. The data elements for the unmatched mail pieces list can include the mail processing machine assigned unique mail piece identification number (MPID), a virtual identification signature for the mail piece, and a list of MPIDs against which the virtual identification signature has already been compared.

The attribute-based recognition process 204 can include a "quick kill" component. The quick kill component can determine whether virtual identification signature matching is required for a newly captured mail piece image. By determining whether virtual identification signature matching can be avoided, the quick kill routine may conserve system resources. The quick kill routine can be executed after image capture and results from barcode reading have been provided. If an ID tag barcode or other barcode or barcode combinations have been read, then a query can be made to the database to determine if there is an unambiguous match to a single mail-piece record. If a unique match is found, then the virtual identification signature matching process for that mail piece can be bypassed, thus conserving resources. If an unambiguous match for the barcode information is not found, then an entry is added to the unmatched mail pieces list, which signals a need for virtual identification signature matching to be performed for this mail piece.

The attribute-based recognition process 204 can include a virtual identification matching component that orchestrates the virtual identification process and attempts to find an unambiguous match for each mail piece listed in the unmatched mail pieces list. The matching component may be executed periodically (e.g., every half second, or other appropriate interval so as to achieve a desired balance between conserving resources and minimizing latency for achieving matches) and asynchronously with respect to mail feeding or other sorting operations. The matching component may exit immediately if there are no entries in the unmatched mail pieces list, or if a flag indicates that no new information has developed since the last invocation of the matching component. The flag for starting the matching component could be set by one of the following: a new "anchor" mail piece has been identified (an anchor mail piece is one in which sufficient confidence has been determined with regard to address resolution and/or virtual identification) and thus a hypothesis for an expected mail piece sequence may be updated, a database record (retrieved by the fetch component described below) has been received, or an entry has been added to the unmatched mail pieces list.

The matching component can provide a loop to process each entry in the unmatched mail pieces list as illustrated by the pseudo code portion shown below (where VID stands for virtual identification signature):

```
Reset global flag indicating new information available for
VID_Match
For each entry in the Unmatched Mail Pieces List:
{    Execute VID_Match_Pre_Process routine
     For each database record identified by
     VID_Match_Pre_Process:
     {    Execute VID_Signature_Compare routine
          Exit Loop if match found
     }
     If signature match was detected:
     {    Report the match results as an output result
          Delete mail piece entry from the Unmatched Mail
          Piece List
          Execute Anchor_Maintenance routine
     }
     Else (signature match not detected):
     {    Commit to the VID_Database_Pre_Fetch input queue
the list of database queries identified by VID_Match_Pre_Process
as needed for the next signature matching attempt for this mail piece.
     }
} (end of pseudo code portion)
```

The attribute-based recognition process 204 can also include a virtual identification signature match pre-processing component. The match pre-processing component can be called for a specific mail piece in the unmatched mail piece list. The match pre-processing component can return a prioritized list of mail piece identification numbers (MPIDs) against which a signature compare routine (described below) should be executed. The generation of the prioritized list can take into account any active anchor mail pieces and any active mail piece sequence hypotheses. The prioritized list can include only MPIDs for which records are available in the external interface computer (i.e., those records that have already been retrieved from the database). The list can exclude those MPIDs for which a virtual identification signature comparison has already been performed for this unmatched mail piece. The list can also exclude those MPIDs of mail pieces that have already been sorted during the sorting operation.

The match pre-processing component can also return a prioritized list identifying database queries needed to support the next attempt at signature matching for the unmatched mail piece. The generation of the list identifying database queries can be generated by taking into account any active anchor mail pieces and any active mail piece sequence hypotheses. In other words, the list may contain one or more database records that have not been retrieved for comparison, but which are indicated by a mail piece sequence hypothesis as being a within a predefined range of mail pieces adjacent to the current unmatched mail piece and, therefore, needed to be retrieved for comparison purposes. The queries in the list may relate to the delivery point on the unmatched mail piece or may relate to neighboring mail pieces (e.g., mail pieces destined to the same bin during a prior sort). The queries in the list can also include a request for a number (e.g., 8) succeeding a given MPID into the same bin during the prior sort. It will be appreciated that the list of subsequent mail pieces is determined by following adjacent mail piece pointers in the database records.

The attribute-based recognition process 204 can also include a virtual identification signature compare (VID compare) routine. The VID compare routine is used to compare two virtual identification signatures and determine the degree to which the two signatures are similar. The VID compare routine can be used to compare the signature from a mail piece on the unmatched mail pieces list with a signature from a mail piece database record that has been retrieved and placed in the search set. The output of the VID compare routine can include a match/no-match decision, and, in the case of match decision, a confidence level.

The attribute-based recognition process 204 can also include an anchor maintenance routine. The anchor maintenance routine maintains a list of anchor mail pieces related to mail piece sequence hypotheses, which can be used to bound search sets for virtual identification signature (VID) matching. When invoked, the anchor maintenance routine can update a "most recent match" field of the anchor which most closely predicts the mail sequence for the match. The anchor maintenance routine can determine whether a matched mail piece should become a new anchor (as described above). The anchor maintenance routine can replace the least recently used anchor when a new anchor is added and all anchors (e.g., a maximum of four) are already in use.

The attribute-based recognition process 204 can also include a database record pre-fetch routine. Because mail piece database records may be used for comparison more than once during a sorting operation, it may be advantageous to maintain the database records corresponding to the expected mail piece sequence in the memory of the computer performing the matching (e.g., an external interface server). The database pre-fetch routine retrieves and maintains a pool of database records needed to support the VID matching operations. The queries performed by the database pre-fetch routine can be based on the entries in a queue that is filled by the match pre-processing routine described above. The database pre-fetch routine can operate asynchronously with respect to other virtual signature identification functions. For example, the database pre-fetch routine can be placed in a separate processing thread to take advantage of multi-core CPUs and avoid impacting other VID functions by incorporating in-line delays for database queries.

The database pre-fetch routine can also incorporate a mechanism (e.g., least recently used) to select database records to discard as new ones are retrieved. For performance purposes, the database pre-fetch routine may be implemented as an application or stored procedure on the mail piece database server that can be invoked by the database pre-fetch routine to retrieve a chain of database records based on their mail piece adjacency fields.

The attribute-based recognition process 204 can also include a database record merge routine. The merge routine can be invoked when a match has occurred and two records exist in the database that correspond to the same mail piece (e.g., an original record created in a first sorting pass and a record created during the sorting pass in which the VID match occurs). The match routine can update the original record with information from the current sorting operation and then delete the new database record.

FIG. 3 is a diagram of an exemplary data record that can form a portion of the output generated by an attribute-based mail piece identification system during a sorting operation or updated during a sorting operation. In particular, the data record can include attributes from other subsystems such as id tag data 302 from an id tag reader, barcode data 304 from a barcode reader, and dimension data 306 from sensors or image analysis. The data record has OCR results 308 which can include region of interest information, descriptions of text, indicia, or the like appearing on the mail piece surface. The data record can also include address recognition results 310 (e.g., ZIP code) which can be derived by automatic address recognition, video coding and/or manual keying. The data record can include an MPM (Mail Processing Machine) ID 312, an identification number that is unique to each MPM and a sort bin 314 (i.e., identification number of a sort bin (or sorting endpoint) to which this mail piece will be sorted. The data record can also include a time stamp 316, a unique id of preceding mail piece in sort bin 318 and a unique id of succeeding mail piece in sort bin is cleared 320, which can be updated later when another mail piece is sorted on top of this one.

The data record can also include a digital signature(s) derived from image analysis or characteristics (virtual identification signature 322). Such a digital signature can include features or values based on a portion of an image of a mail piece. In other words, characteristics of the mail piece image can be used to recognize or identify a mail piece in a manner similar to the use of fingerprint images to identify people. The mail piece virtual identification signature 322 is preferably, but not necessarily, unique such that the virtual identification signature attributes will correspond to one mail piece in the mail piece database. It will be appreciated that the virtual identification signature doesn't necessarily need to be unique with respect to all of the records in the mail piece database, but only unique with respect to the current search set. However, even a determination that virtual identification signature data is not unique or is not present in the database or search set may be a characteristic that can be used to identify the mail piece.

FIG. 4 is a diagram of another exemplary data record that can form a portion of the output generated by an attribute-based mail piece identification system during a sorting operation or that can be updated during a sorting operation. In particular, the data record can include attributes from other subsystems such as mail piece ID tag data 402 from an ID tag reader, barcode data 404 from a barcode reader, and dimension data 406 from sensors. The data record can include OCR results 408 which can include region of interest information, descriptions of text, indicia, or the like appearing on the mail piece surface. The data record can also include address recognition results 410 (e.g., ZIP code) which can be derived by automatic address recognition, video coding and/or manual keying. The data record can include an MPM (Mail Processing Machine) ID 412, an identification number that is unique to each MPM. The data record can also include a time stamp 414, a unique id of preceding mail piece in sort bin 416 and a unique id of succeeding mail piece in sort bin is cleared 418, which can be updated later when another mail piece is sorted on top of this one.

The data record can also include a virtual identification signature 420 derived from image analysis or characteristics. The virtual identification signature 420 can include features or values based on a portion of an image of a mail piece. In other words, characteristics of the mail piece image can be used to recognize or identify a mail piece in a manner similar to the use of fingerprint images to identify people. Preferably, the virtual identification signature 420 is sufficiently representative of the mail piece such that the signature can be used during subsequent sorting operations to re-identify the mail piece. The mail piece virtual identification signature data 420 is preferably, but not necessarily, unique such that the image fingerprint data will correspond to one mail piece in the mail piece database. However, even a determination that virtual identification signature data is not unique or is not present in the database can be a characteristic that can be used to identify a mail piece.

Figure 5:
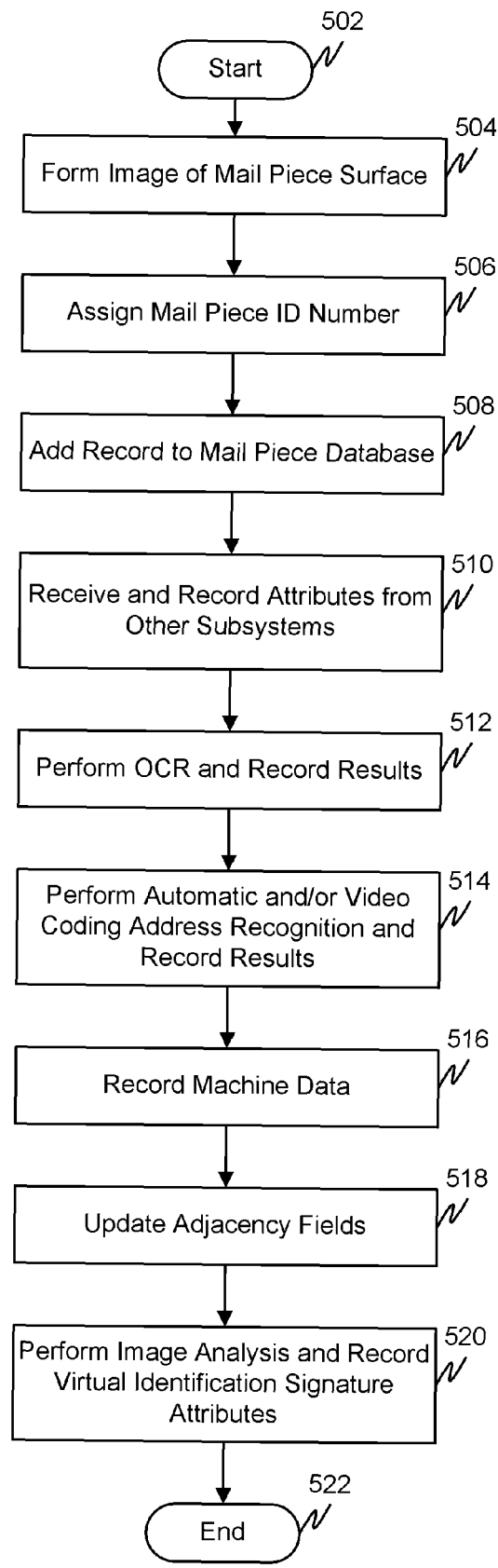
FIG. 5 is a flowchart illustrating an exemplary first phase of a method for attribute-based mail piece identification.

FIG. 5 is a flowchart illustrating an exemplary method for a first phase of an attribute-based mail piece identification process. Processing begins at step 502 and continues to step 504.

In step 504, an image is formed of a mail piece surface. This is typically an image of the front of a mail piece and includes destination address, return address, postage indicia, and other information such as special services and/or mail piece tracking information. Once the image is formed it can be sent to a recognition system such as the centralized recognition system described above. Processing continues to step 506.

In step 506, a mail piece identification number is optionally assigned to the mail piece image record and may also be printed or applied to the mail piece. A mail piece identification number facilitates the identification of each unique mail piece in a stream of mail being sorted. The mail piece identification number may form a unique key that can be associated with a database record for storing information related to the mail piece. Processing continues to step 508.

In step 508, a record is added to a mail piece database. The record corresponds to the mail piece image that has been formed and can contain the unique mail piece identification number as a key value, for example. Processing continues to step 510.

In step 510, attributes of the mail piece are received from other subsystems and recorded in the database. The other subsystems can include barcode sensors, weight and dimension sensors, radio-frequency identification tag readers, chemical or biological sensors, and/or any other known or later developed subsystems for detecting an attribute of a mail piece. Processing continues to step 512.

In step 512, optical character recognition (OCR) is performed on the mail piece image and the results of the OCR process are recorded in the database record. A goal of the OCR process is typically to identify text blocks of interest (e.g., destination address and return address blocks) and to determine the characters, words or strings contained in those blocks. The OCR process may be employed for machine printed text and a separate process may be employed for handwritten text. The process for handwritten text may be more closely related with the address recognition step described below. The centralized recognition system is tasked with returning information to a sorting machine that will allow the sorting machine to properly sort the mail piece, typically sorting is done to a specified level of detail of the destination address. For example, a first sorting pass may only require that mail be sorted to a region. While a subsequent sorting pass (or passes) may require that mail be sorted to a delivery point or placed into walk order for delivery by a mail carrier. Processing continues to step 514.

In step 514, address recognition is attempted using the results of the OCR processing in step 512, or in the case of handwritten text, the address recognition step may be integral with the determination of the handwritten text. Typically, an automatic address recognition process is attempted first in order to avoid the cost and delay of human intervention. Then, if the results from the automatic address recognition process are not satisfactory (e.g., low confidence or unrecognizable characters), a video coding process may be performed in which a human operator assist with the recognition of the address information in the mail piece image. In any event, the address recognition results are recorded in the database record corresponding to the mail piece. Processing continues to step 516.

In step 516, data associated with the sorting machine can be recorded in the database record corresponding to the mail piece. This data can include the machine identification number, the time the mail piece was processed, the type of sort being performed, or the like. In general, any characteristic of the machine suitable for use in identifying mail pieces, measuring performance, or diagnosing problems can be recorded. Processing continues to step 518.

In step 518, adjacency fields are updated. The adjacency fields can be update to reflect that a next mail piece has been sorted to a particular endpoint. This information can be helpful in a subsequent sorting operation when trying to identify a mail piece that is difficult to otherwise identify by focusing the queries and helping to facilitate an expected mail piece sequence hypothesis. By knowing a previous or next mail piece, a reasonable prediction can be made about the identity of an unidentified mail piece. Processing continues to step 520.

In step 520, an analysis of the mail piece image is performed and virtual identification signature attributes are generated and recorded. The virtual identification signature attributes are those attributes of the image that may tend to distinguish the mail piece from others during a subsequent sorting operation. Processing continues to step 522, where processing ends. It will be appreciated that steps 504-520 may be repeated in whole or in part in order to perform a contemplated mail sorting operation.

Figure 6:
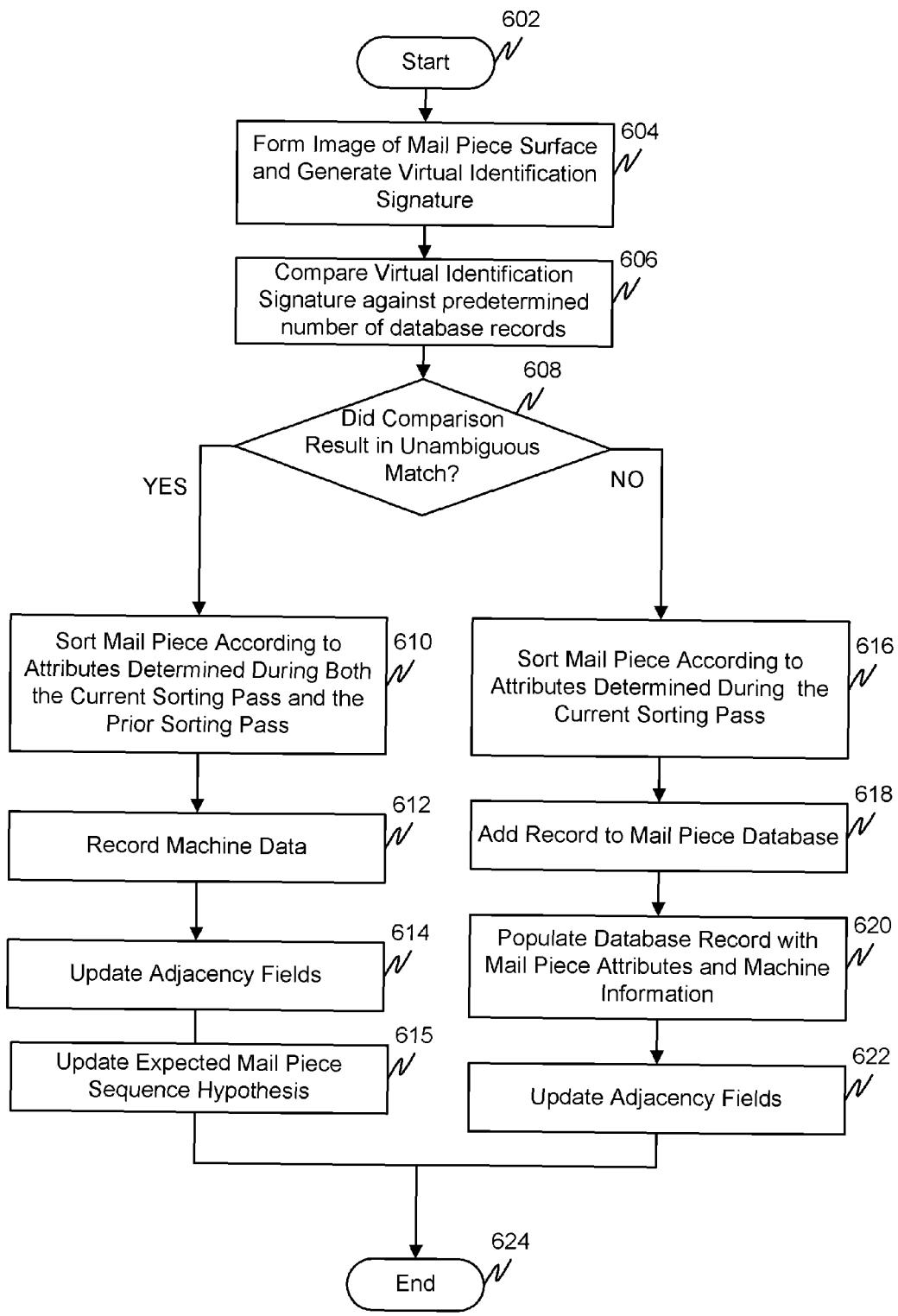
FIG. 6 is a flowchart illustrating an exemplary second phase of a method for attribute-based mail piece identification.

FIG. 6 is a flowchart illustrating an exemplary method for attribute-based mail piece identification showing a second phase. Processing begins at step 602 and continues to step 604.

In step 604, an image of a mail piece surface is formed (similar to step 504 of FIG. 5 described above) and obtained by a recognition system. Processing continues to step 606.

In step 606, attribute information, derived from the mail piece image formed and obtained in step 604 is used, in whole or in part, to compare against one or more database records in an effort to identify the mail piece from a previous sorting operation. The retrieved records may be restricted based on expected mail sequence. Processing continues to step 608.

In step 608, it is determined whether an unambiguous match has resulted. An unambiguous match result can be a result in which only one record in the database matched the query parameters. If the result was unambiguous, processing continues to step 610, however, if the result was not an unambiguous match, the processing continues to step 616.

In step 610, the mail piece is sorted according to attributes determined during the current sorting pass and the previous sorting pass. For example, the previous sorting pass may have determined that the mail piece was to be delivered to the region of the country in which ZIP codes begin with 22. During the second sorting operation, the mail piece may have been unambiguously identified and the information stored in the database record for the mail piece can be used in the second sorting operation, which may have determined that the mail piece is to be delivered to the post office serving the ZIP code 22102. Thus, by combining the information determined in each sorting pass, the mailpiece can be sorting accordingly. Processing continues to step 612.

In step 612, machine data can be recorded (similar to step 516 described above). Processing continues to step 614, where adjacency fields are updated. The adjacency fields may need to be updated to reflect that a subsequent, and likely different, sorting operation has been performed and the mail pieces may have changed adjacency based on being sorted to different bins or endpoints. Processing continues to step 615.

In step 615, one or more mail piece sequence hypotheses are updated as may be needed to reflect the match that has been made. For example, the matched mail piece may meet the criteria for becoming an anchor mail piece and one or more hypotheses may need to be revised based on the new anchor. Processing continues to step 624, where processing ends (for the unambiguous match path).

Turning back to the case in which an unambiguous match was not obtained, in step 616, because the mail piece could not be unambiguously identified during based on the attributes, it can only be sorted base on the second or subsequent sorting information, or if attributes determined by automatic processing during this sorting pass are insufficient for sorting, video coding can be invoked in an attempt to resolve the attributes. Processing continues to step 618.

In step 618, a new database record is added to the mail piece database to record the attribute information determined for the mail piece during the second or subsequent sorting operation. Processing continues to step 620.

In step 620, the new database record is populated with mail piece attributes and machine information. Processing continues to step 622.

In step 622, adjacency fields are updated as described above. Processing continues to step 624, where processing ends. Of course, it will be appreciated that steps 604-624 may be repeated in whole or in part in order to accomplish a contemplated mail sorting operation.

Figure 7:
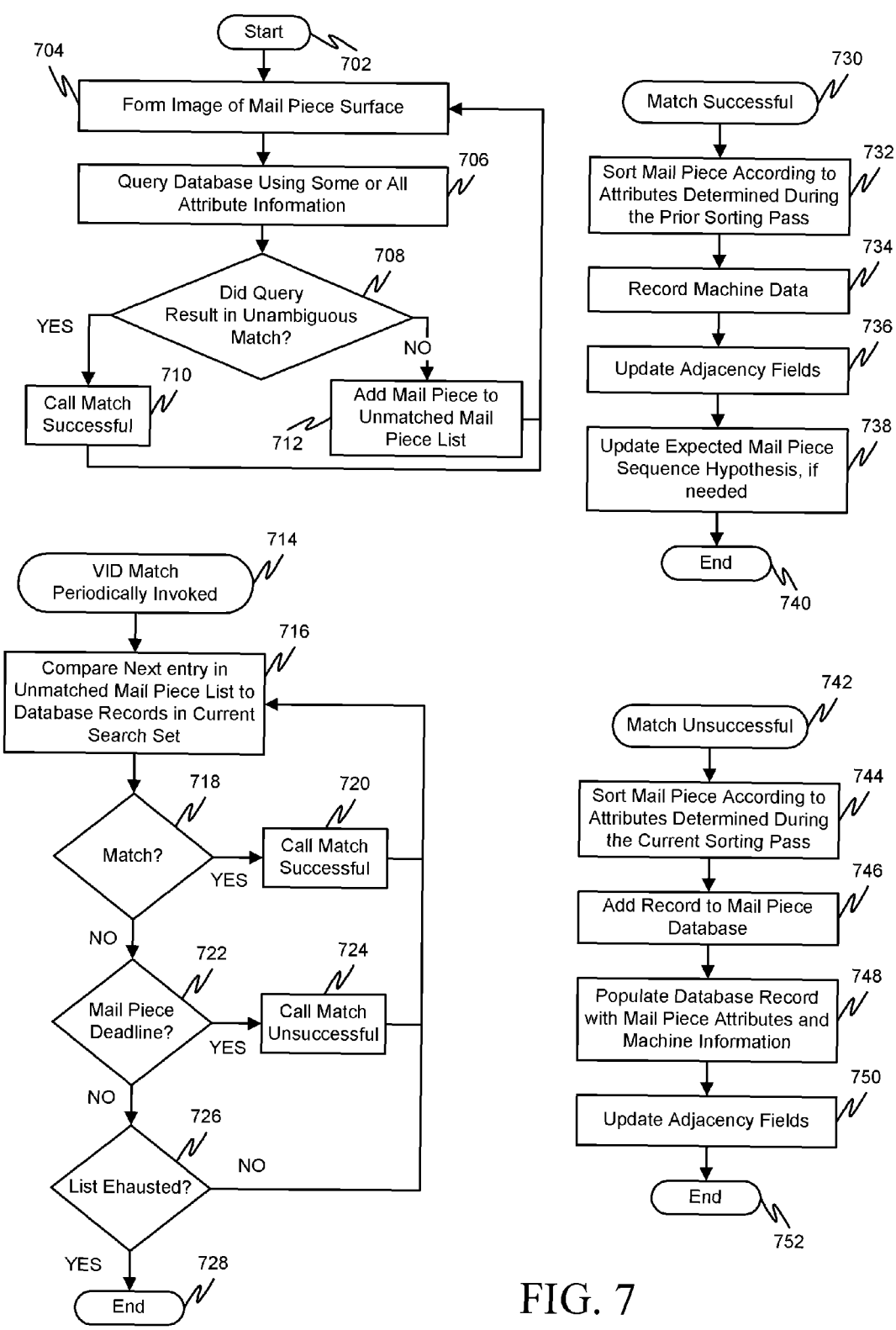
FIG. 7 is a flowchart illustrating an exemplary second phase of a method for attribute-based mail piece identification.

FIG. 7 is a flowchart illustrating an exemplary method for attribute-based mail piece identification showing a different method for the second phase. There are four processing threads or routines shown, which comprise the processing for this exemplary embodiment of the second phase of attribute-based mail piece identification. A main process (starting at 402) is invoked as mail pieces are being fed in for a second sorting operation. A VID Match process (starting at 714) can be periodically invoked asynchronously to the operation of the main process. A match successful routine (starting at 730) and a match unsuccessful routine (starting at 742) can be invoked at various stages of processing as described below.

Processing for the main routine or thread begins at step 702 and continues to step 704.

In step 704, an image of a mail piece surface is formed (similar to step 504 of FIG. 5 described above) and obtained by a recognition system. Processing continues to step 706.

In step 706, attribute information, derived from the mail piece image formed and obtained in step 704 is used, in whole or in part, to query a database in an attempt to identify the mail piece from data records stored during a previous sorting operation. The attribute information can be one or more decoded barcodes. Processing continues to step 708.

In step 708, it is determined whether an unambiguous match has resulted. An unambiguous match results can be a result in which only one record in the database matched the query parameters. If the result was unambiguous, processing continues to step 710 where the Match Successful routine is called (described below) and control continues to step 730, however, if the result was not unambiguous, the processing continues to step 712 (described below). Once the Match Successful routine call returns, processing continues to step 704, where an image of a next mail piece, if one is available, can be formed.

The Match Successful processing begins at step 730 and continues to step 732. In step 732, the mail piece is sorted according to attributes determined during the prior sorting pass. Processing continues to step 734.

In step 734, machine data can be recorded (similar to step 516 described above). Processing continues to step 736, where adjacency fields are updated. The adjacency fields may need to be updated to reflect that a subsequent, and likely different, sorting operation has been performed and the mail pieces may have changed adjacency based on being sorted to different bins or endpoints. Processing continues to step 738.

In step 738, one or more mail piece sequence hypotheses are updated as may be needed to reflect the match that has been made. For example, the matched mail piece may meet the criteria for becoming an anchor mail piece and one or more hypotheses may need to be revised based on the new anchor. Processing continues to step 740, where processing for the Match Successful routine ends and control returns to the routine that called Match Successful (in this example, either the main routine or the VID match routine).

Returning back to the case where the result determined in step 708 is not unambiguous, in step 712, the current (not unambiguously identified) mail piece image is added to the unmatched mail piece list and a next mail piece is processed in step 704. As mentioned above, placement of the mail piece on the unmatched mail piece list may be limited to a predetermined number, depending on the requirements or limitations of a particular embodiment.

The VID Match routine can be periodically invoked and may execute asynchronously with other routines or threads. The VID Match routine can be invoked based on a timer, an interrupt, a software signal, a flag, a semaphore, or the like, or a combination of two or more of the above. Processing for the VID Match routine begins at step 714 and continues to step 716.

In step 716, a next entry (which may be the first entry) in the Unmatched Mail Piece list is compared to the database records in the current search set. Processing continues to step 718, where the result of the comparison is evaluated. If a match occurred between the entry from the unmatched mail piece list and one of the database records in the current search set, processing continues to step 720. Otherwise, processing continues to step 722.

In step 720, the Match Successful routine (described above) is called. Upon return from the Match Successful routine, processing continues to step 716.

In step 722, the mail piece deadline is evaluated. This can include comparing an amount of time that the mail piece has been listed on the unmatched mail pieces list with a predetermined threshold. Alternatively, the deadline may be reached if a mail piece has been pending for a relatively long time and new mail pieces are being listed on the unmatched mail pieces list and space in the unmatched mail piece list is needed. This can include comparing the amount of time since the mail piece was inducted (fed) with a predetermined threshold. The deadline may be reached, for example, at the latest point providing sufficient time to execute anticipated further processing steps needed to sort the mail piece. If the deadline has been reached, processing continues to step 724. Otherwise, processing continues to step 726.

In step 724, the Match Unsuccessful routine (described below) is called. Upon return from the Match Unsuccessful routine processing continues to step 716.

In step 726, the unmatched mail piece list is evaluated. If there are more entries in the list to be compared to the current search set, then processing continues to step 716. If the unmatched mail piece list has been exhausted (i.e., all entries have been compared with the current search set), then processing continues to step 728, where processing for the VID Match routine ends for the current invocation.

The Match Unsuccessful routine begins at step 742 and processing continues to step 744. In step 744, the mail piece is sorted according to attributes determined during the current sorting operation. Processing continues to step 746.

In step 746, a record corresponding to the mail piece and containing some or all of the attribute information is added to the mail piece database. Processing continues to step 748.

In step 748, the database record added in step 746 is populated with the attribute information and machine information. Processing continues to step 750.

In step 750, adjacency records for this mail piece and the preceding mail piece to the same sort bin are updated. Processing continues to step 752, where processing ends for the Match Unsuccessful routine and processing returns to the routine that invoked Match Unsuccessful (e.g., VID Match).

It will be appreciated that the modules, processes, systems, routines, threads, or sections described above can be implemented in hardware, software, or both, unless otherwise specified. Also, the modules, processes systems, and sections can be implemented in hardware as a single processor or as a distributed processor. Further, it should be appreciated that the steps mentioned above may be performed on a single or distributed processor. Also, the processes, modules, routines and sub-modules described in the various figures of the embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hardwired analog logic circuit, software stored on a computer-readable medium or signal, a programmed kiosk, an optical computing device, a GUI on a display, a networked system of electronic and/or optical devices, a special purpose computing device, an integrated circuit device, a semiconductor chip, and a software module or object stored on a computer-readable medium or signal, for example. A computer readable medium can include, but is not limited to, an optical or magnetic storage device, a semiconductor memory device (e.g., RAM, ROM, or flash memory) or other known or later developed medium readable by a computer.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any process capable of implementing the functions or steps described herein can be used to implement embodiments of the method, system, or a computer program product (software program embodied on a computer readable medium).

Furthermore, embodiments of the disclosed method, system, and computer readable medium bearing software (computer program product) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the computer, image processing, and/or mail handling arts.

Moreover, embodiments of the disclosed method, system, and computer program product can be implemented in software executed on a programmed general purpose computer, a special purpose computer, a microprocessor, or the like. Also, the method of this invention can be implemented as a program embedded on a personal computer such as a JAVA® or CGI script, as a resource residing on a server or image processing workstation, as a routine embedded in a dedicated processing system, or the like. The method and system can also be implemented by physically incorporating the method into a software and/or hardware system, such as the hardware and software systems of mail sorting equipment.

It is, therefore, apparent that there is provided, in accordance with the present invention, a method, computer system, apparatus, and computer readable medium bearing a computer software program for attribute-based mail piece identification. While this invention has been described in conjunction with a number of embodiments, it is evident that many alternatives, modifications and variations would be or are apparent to those of ordinary skill in the applicable arts. Accordingly, Applicant intends to embrace all such alternatives, modifications, equivalents and variations that are within the spirit and scope of this invention.

What is claimed is:

1. A centralized recognition system for sorting mail comprising:

a first computer having a first processor adapted to obtain, during a first sorting operation, a first image of at least one surface of a mail piece;

a second computer having a second processor and being adapted to receive from the first computer the mail piece image, a first request for address recognition and a first request for virtual identification signature extraction, the second computer adapted to create a database record in a mail piece database, the database record corresponding to the mail piece and being identified by a unique mail piece identification number; and a third computer having a third processor and being adapted to receive from the second computer the mail piece image, the first request for address recognition and the first request for virtual identification signature extraction, wherein the third computer is adapted to perform an automatic address recognition process on the mail piece image and to determine a virtual identification signature based on the mail piece image and a portion of a result of the automatic address recognition process, the third computer being adapted to provide the result of the automatic address recognition process and the virtual identification signature to the second computer, wherein the second computer is further adapted to provide the result of the automatic address recognition process to the first computer and to update the database record to include the result of the automatic address recognition process and the virtual identification signature, wherein the first computer is further adapted to receive the result of the automatic address recognition process and provide a sort attribute to a mail processing machine and, after the mail piece is sorted, to update the database record with a sort bin attribute and adjacency information associated with a preceding mail piece and to update a preceding mail piece database record with adjacency information associated with the mail piece, wherein, during a second sorting operation subsequent to the first sorting operation, the first computer obtains a second image of at least one surface of the mail piece and attempts to identify the mail piece using a unique indicium in the second image, wherein if a unique indicium is found then the database record for the mail piece is retrieved and the mail piece is sorted using the information in the database record, if a unique indicium is not found, then the first computer adds an entry to an unmatched mail piece list and the second image, a second request for address recognition and a second request for virtual identification signature extraction, wherein, the second computer is adapted to create, during the second sorting operation, a new database record for the mail piece and to provide the second image, the second request for address recognition and the second request for virtual identification signature extraction of the second image to the third computer, wherein the third computer is adapted to perform an automatic address recognition process on the second image and to determine a virtual identification signature based on the second image and a portion of a result of the automatic address recognition process on the second image, the third computer is adapted to provide the result of the automatic address recognition process on the second image and the virtual identification signature of the second image to the second computer, wherein the second computer is adapted to provide the result of the automatic address recognition process on the second image and the virtual identification signature of the second image to the first computer and update the new database record with the result of the automatic address recognition process on the second image and the virtual identification signature of the second image, and wherein the first computer is adapted to add, during the second sorting operation, the result of the automatic address recognition process on the second image and the virtual identification signature of the second image to the entry in the unmatched mail piece list and, if there are entries in the unmatched mail piece list, to periodically and asynchronously perform a virtual identification signature matching process on any entries in the unmatched mail piece list.

2. The centralized recognition system of claim 1, wherein the virtual identification signature matching process includes the first computer processing each entry in the unmatched mail piece list and attempting to match the virtual identification signature of that entry to one of a plurality of virtual identification signatures associated with a predetermined number of database records selected from the mail piece database.

3. The centralized recognition system of claim 2, wherein the virtual identification signature matching process includes the first computer deleting from the unmatched mail piece list any entries that have been identified by having a virtual identification signature that matches one of the predetermined number of database records selected from the mail piece database.

4. The centralized recognition system of claim 3, wherein the predetermined number of database records selected from the mail piece database are selected asynchronously with respect to the virtual identification signature matching process and each of the first and second mail sorting operations.

5. The centralized recognition system of claim 4, wherein, if an entry from the unmatched mail piece list matches one of the predetermined number of records selected from the mail piece database, a mail piece database record created during the second sorting operation and corresponding to the matching entry is merged with a corresponding mail piece database record created during the first sorting operation.

6. The centralized recognition system of claim 5, wherein, if an entry in the unmatched mail piece list remains unmatched after a predetermined period of time, then the first computer deletes the entry from the unmatched mail piece list and continues sorting of the mail piece associated with the unmatched entry if a destination was determined during the second sorting operation or requests a video coding operation if a destination was not determined during the second sorting operation.

7. The centralized recognition system of claim 6, wherein the predetermined number of database records includes only those in an expected mail sequence and the expected mail piece sequence is based on a mail piece sequence hypothesis determined using adjacency information recorded in mail piece records contained in the mail piece database.

8. The centralized recognition system of claim 7, wherein during the merging of the mail piece database record created during the second sorting operation corresponding to the matching entry and the corresponding mail piece database record created during the first sorting operation, the merged database record includes information determined during the second sorting operation.

9. A method for attribute-based mail piece identification comprising:

obtaining, during a first sorting operation, a first image of at least one surface of a mail piece;

adding a database record to a mail piece database, the database record corresponding to the mail piece;

generating a first set of attribute information corresponding to the first image, including performing an analysis of the first image and determining a first signature based on one or more characteristics of the first image;

updating fields in the database record to store the first set of attribute information;

updating adjacency information in another database record corresponding to a preceding mail piece to indicate that the mail piece has been sorted immediately after the preceding mail piece and to the same sort location as the preceding mail piece and updating the database record to indicate adjacency to the preceding mail piece;

obtaining, during a second sorting operation, a second image of at least one surface of the mail piece;

generating a second set of attribute information corresponding to the second image, including performing an analysis of the second image and determining a second signature based on one or more characteristics of the second image;

comparing a portion of the second set of attribute information with attribute information from a predetermined number of mail piece database records, the predetermined number of records selected based on an expected mail piece sequence;

if the comparison results in an unambiguous match, performing a series of steps including:
sorting the mail piece based on the second set of attribute information,
updating the database record corresponding to the mail piece with information obtained during the second sorting operation,
updating another database record to record adjacency information based on the second sorting operation, and
forming an updated hypothesis of mail sequence based on the adjacency information contained in the database record corresponding to the mail piece if the comparison does not result in an unambiguous match, performing a series of steps including:
sorting the mail piece based on attributes determined during the second sorting operation, and
adding an additional database record to the mail piece database, the additional database record corresponding to the mail piece and including the second set of attribute information.

10. The method of claim 9, further comprising generating a unique mail piece identification number for each mail piece and storing the first and second attribute information for each mail piece in a record associated with the unique mail piece identification number of that mail piece.

11. The method of claim 9, wherein the generating first and second attribute information includes attempting to read a barcode applied to the mail piece.

12. The method of claim 9, wherein if the comparison does not result in an unambiguous result, using the indication of no unambiguous result as an attribute for storing and retrieving a mail piece record corresponding to the second image.

13. An apparatus for attribute-based mail piece identification comprising:
means for obtaining, during a first sorting operation, a first image of at least one surface of a mail piece;
means for adding a database record to a mail piece database, the database record corresponding to the mail piece;
means for generating a first set of attribute information determined by performing an analysis of the first image;
means for obtaining, during a second sorting operation, a second image of at least one surface of the mail piece;
means for generating a second set of attribute information determined by performing an analysis of the second image;
means for comparing the first set of attribute information and the second set of attribute information;
means for performing a first series of sub-steps, the first series of sub-steps being performed if the comparison results in an unambiguous match, including:
sorting the mail piece based on the second set of attribute information,
updating the database record corresponding to the mail piece with information obtained during the second sorting operation,
updating another database record to record adjacency information based on the second sorting operation, and
forming a hypothesis of mail sequence based on the adjacency information contained in the database record corresponding to the mail piece
means for performing a second series of sub-steps, the second serried of sub-steps being performed if the comparison does not result in an unambiguous match, including:
deferring the processing of the mail piece;
processing one or more subsequent mail pieces until a mail piece is identified; and
attempting to identify the deferred mail pieces based on adjacency information associated with the identified mail piece and a comparison of attribute information.

14. The apparatus of claim 13, further comprising:
means for generating a unique mail piece identification number for each mail piece and storing the first and second attribute information for each mail piece in a record associated with the unique mail piece identification number of that mail piece.

15. The apparatus of claim 13, further comprising:
means for updating adjacency information in another database record corresponding to a preceding mail piece to indicate that the mail piece has been sorted immediately after the preceding mail piece and to the same sort location as the preceding mail piece.

16. The apparatus of claim 13, wherein the comparison includes comparing all mail piece records.

17. The apparatus of claim 13, wherein the comparing includes comparing only a predetermined number of records in an expected mail sequence.

18. The apparatus of claim 13, wherein if the comparison does not result in an unambiguous result, using the indication of an ambiguous result as an attribute for storing and retrieving a mail piece record corresponding to the second image.

19. A method for sorting mail comprising:
determining, during a first sorting operation, a first virtual identification signature for a first image of a mail piece;
storing the first virtual identification signature in a database record associated with the mail piece;
determining, during a second sorting operation subsequent to the first sorting operation, a second virtual identification signature for a second image of the mail piece;
comparing the first virtual identification signature and the second virtual identification signature;
identifying the mail piece and retrieving the database record based on a result of the comparing; and
supplementing the database record with mail piece information derived from the second image.

20. The method of claim 19, wherein the comparing includes selecting a predetermined number of mail piece database records based on a hypothesis of an expected mail piece sequence.

* * * * *